United States Patent [19]

Fillmore et al.

[11] 4,245,225

[45] Jan. 13, 1981

[54] INK JET HEAD

[75] Inventors: Gary L. Fillmore, Boulder; Arthur R. Hoffman, Longmont; Thomas Young, Boulder, all of Colo.

[73] Assignee: International Business Machines Corporation, Armonk, N.Y.

[21] Appl. No.: 958,916

[22] Filed: Nov. 8, 1978

[51] Int. Cl.³ .............................................. G01D 15/18

[52] U.S. Cl. ................................. 346/75; 346/140 R; 239/4; 239/102

[58] Field of Search ................... 239/4, 101, 102, 696; 346/75, 140 R

[56] References Cited

U.S. PATENT DOCUMENTS

| | | | |
|---|---|---|---|
| 3,150,592 | 9/1964 | Stec . | |
| 3,211,088 | 10/1965 | Naiman | 239/102 X |
| 3,215,078 | 11/1965 | Stec | 310/328 X |
| 3,452,360 | 6/1969 | Williamson | 310/140 PD |
| 3,679,132 | 7/1972 | Vehe et al. | 239/4 |
| 3,683,212 | 8/1972 | Zoltan | 310/75 X |
| 3,832,579 | 8/1974 | Arndt | 310/140 PD X |
| 3,848,118 | 11/1974 | Rittberg | 239/101 |
| 3,900,162 | 8/1975 | Titus et al. | 239/102 |
| 3,924,974 | 12/1975 | Fischbeck | 239/101 X |
| 4,138,687 | 2/1979 | Cha et al. | 346/75 |
| 4,144,537 | 3/1979 | Kimura et al. | 346/140 R |

*Primary Examiner*—George H. Miller, Jr.
*Attorney, Agent, or Firm*—Frank C. Leach, Jr.

[57] ABSTRACT

An inner cylindrical tube has its outer cylindrical surface spaced from an inner cylindrical surface of outer means to have an ink cavity therebetween from which ink is supplied through one or more ink jet nozzles. At least the inner tube is a piezoelectric material so that the inner tube vibrates radially when electrically excited to produce vibrations at a desired operating frequency whereby a stream of ink droplets is supplied from each of the ink jet nozzles. The spacing between the inner surface, which has its longitudinal axis coaxial with the longitudinal axis of the inner cylindrical tube, of the outer means and the outer surface of the inner cylindrical tube is selected so that the ink cavity is resonant at the operating frequency of the inner cylindrical tube. To maintain the lowest frequencies of perturbations in the axial direction of the inner cylindrical tube substantially greater than the operating frequency, the inner cylindrical tube can be formed of a plurality of longitudinal segments acoustically isolated from each other in the axial direction. In another form, the outer means is a body formed with a membrane providing acoustical communication from a liquid cavity between the inner tube and the body and each ink cavity, which has ink jet nozzles at its end. The liquid cavity preferably has a liquid of substantially the same density as the ink. This enables each of the ink cavities to have a different colored ink if desired.

106 Claims, 16 Drawing Figures

INK JET HEAD

Cross reference is made to the copending patent application of Konrad A. Krause for "Ink Jet Head Having Inner Member Surface Circuitously Parallel To Outer Member Surface," Ser. No. 93,490, filed Nov. 13, 1979, which is a continuation of application Ser. No. 958,855, filed Nov. 8, 1978, now abandoned, and assigned to the same assignee as the assignee of this application.

When a plurality of ink jet nozzles is connected to an ink cavity, it is desired that the ink droplets produced from the streams passing through each of the nozzles have substantially the same break-off point, be substantially uniform in size, have substantially uniform spacing between the droplets, and be satellite free. This insures that the quality of the print from each of the nozzles will be substantially the same.

To obtain this uniformity between the droplets of the various streams, it is necessary that the perturbations applied to each of the ink streams of the nozzles be substantially uniform and that the nozzles be of uniform quality. Furthermore, for the production of the droplets to be satellite free, the perturbations must be sufficiently large. It also is a requisite for the perturbations to not only be substantially uniform but to be reproducible throughout the time that the droplets are being produced.

It also is necessary that the transducer or driver, which produces the vibrations to create the perturbations in the ink streams, be capable of producing the droplets at the desired frequency. This is determined by the over-all requirements of the ink jet system including the size of the droplets, the spacing between the droplets on the medium on which the droplets are impinged, the rate at which the droplets can be charged, and the rate of relative movement between the medium and the nozzles. Thus, the transducer or driver must be capable of operating at a specific frequency.

The present invention satisfactorily meets the foregoing requirements through providing a transducer or driver operating at a frequency at which the ink cavity is in liquid resonance. Thus, maximum efficiency of the perturbations produced by the transducer or driver in the ink is obtained.

The present invention accomplishes this through providing a pair of elements with one of the elements surrounding the other and the elements having their longitudinal axes preferably coaxial and at least parallel. At least the inner element, which is preferably a right circular cylindrical tube, is formed of a piezoelectric material and is polarized to vibrate substantially perpendicular to its longitudinal axis when electrically excited so that nozzles, disposed substantially perpendicular to the longitudinal axis of the inner element, will have the streams of ink droplets supplied therefrom uniformly.

The present invention enables a relatively long array of ink jet nozzles to have uniform break up of streams supplied therefrom in comparison with previously known ink jet heads. The ink jet head of the present invention is capable of providing an array of nozzles of any length while still obtaining uniform break up of each stream applied through the ink jet nozzles of the array.

The ink jet head of the present invention is capable of having a plurality of arrays supplying streams of ink droplets therefrom at the same time. Furthermore, in one embodiment, the ink stream from each array can be a different color than the other streams.

In some previously known ink jet heads, epoxy has been used to secure some of the parts in areas in which epoxy is subject to ink. It has been found that epoxy is attacked by ink so that its life is rather limited such as a period of one year, for example. Thus, some ink jet heads have required overhauling for replacement of epoxy after the limited period of time.

The present invention satisfactorily solves the foregoing problem through providing an ink jet head in which the elements are secured to each other without the use of epoxy in areas in which ink can attack epoxy. The present invention accomplishes this through forming the elements of the ink jet head so that they are secured to each other by screws, for example.

An object of this invention is to provide an ink jet head of a relatively long length in which there is uniform generation of droplets from each nozzle.

Another object of this invention is to provide a unique ink jet head.

A further object of this invention is to provide a method for forming an ink jet head of relatively long length in which there is uniform generation of droplets from each nozzle.

Still another object of this invention is to provide a method for forming a unique ink jet head.

The foregoing and other objects, features, and advantages of the invention will be apparent from the following more particular description of preferred embodiments of the invention as illustrated in the accompanying drawings.

Figure 2:
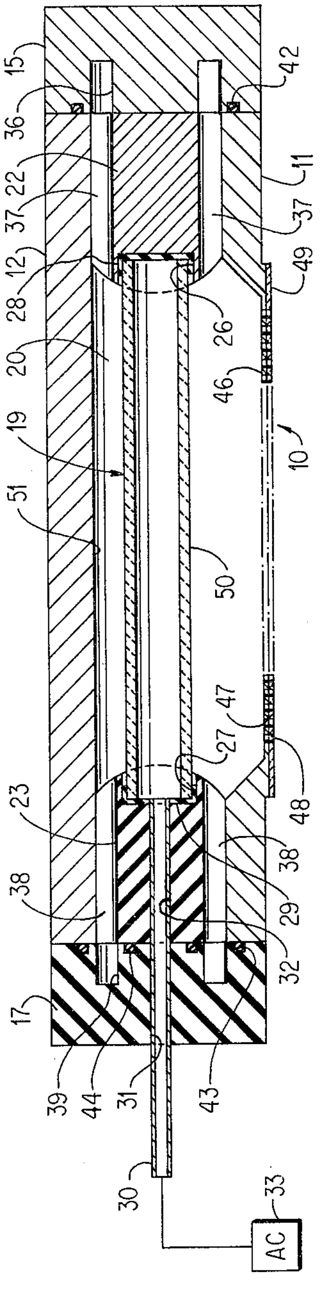
FIG. 2 is a longitudinal sectional view of the ink jet head of FIG. 1 and taken along line 2—2 of FIG. 1.
Figure 1:
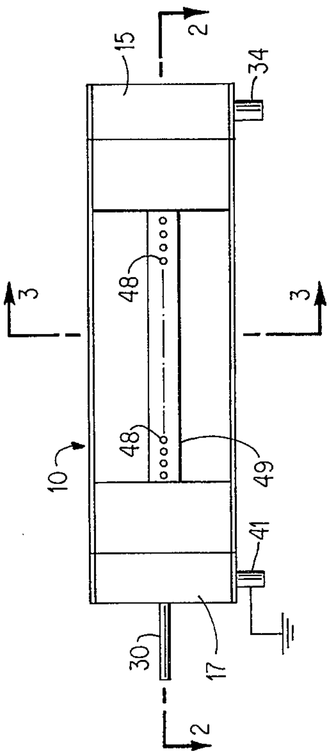
FIG. 1 is a side elevational view of an ink jet head of the present invention having a single array of ink jet nozzles.

Referring to the drawings and particularly FIGS. 1 and 2, there is shown an ink jet head 10 of the present invention. The head 10 includes a nozzle mounting plate 11 and a back plate 12 with a gasket 13 therebetween. The nozzle mounting plate 11, the back plate 12, and the gasket 13 are held together by screws 14.

An entry end plate 15 is secured to one end of the nozzle mounting plate 11 and the back plate 12 by suitable means such as screws (not shown), for example. An exit end plate 17, which is formed of an electrically insulating material, is secured to the other end of each of the nozzle mounting plate 11 and the back plate 12 by suitable means such as screws (not shown), for example.

A right circular cylindrical tube 19 is disposed within an ink cavity 20, which is a longitudinal passage, in the nozzle mounting plate 11 and the back plate 12. The tube 19 has one end supported within an entry end plug 22 and its other end supported within an exit end plug 23, which is formed of an electrically insulating material. Each of the plugs 22 and 23 is supported between the nozzle mounting plate 11 and the back plate 12.

The tube 19 fits within a circular recess 26 (see FIG. 7) in a spherical end surface of the plug 22 and a circular recess 27 (see FIG. 6) in a spherical end surface of the plug 23. A rubber boot or gasket 28 (see FIG. 2) holds one end of the tube 19 within the recess 26 in the plug 22, and a rubber boot or gasket 29 holds the other end of the tube 19 within the recess 27 in the plug 23.

The tube 19 is formed of a piezoelectric material and polarized so that it vibrates in a radial direction when a voltage is applied thereto. The operating frequency at which the tube 19 is electrically excited is the frequency at which the droplets are to be produced.

An electrode 30 extends through a passage 31 in the end plate 17 and a passage 32 in the plug 23. The electrode 30 is electrically connected to the inner cylindrical surface of the tube 19 so that the tube 19 is electrically connected to an AC source 33 of power.

Figure 5:
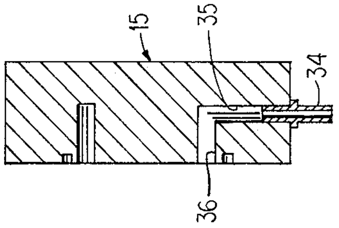
FIG. 5 is a sectional view of the other of the end plates of the ink jet head of FIG. 1.
Figure 7:
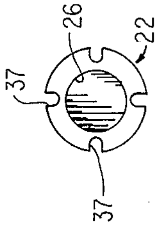
FIG. 7 is an end elevational view of the other of the end plugs of the ink jet head of FIG. 1.

The ink cavity 20 has pressurized, conductive ink supplied thereto from a pressurized source through a connecting plug 34 (see FIG. 1) and a passage 35 (see FIG. 5) in the end plate 15 to an annular passage or cavity 36, which communicates with a plurality of passages 37 (see FIG. 2) in the plug 22. As shown in FIG. 7, there are four of the passages 37 equally angularly spaced about the circumference of the plug 22. Thus, the pressurized ink is easily supplied to the ink cavity 20.

Figure 6:
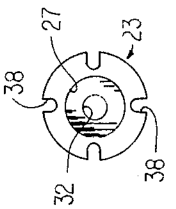
FIG. 6 is an end elevational view of one of the end plugs of the ink jet head of FIG. 1.

Whenever it is desired to flush the ink cavity 20, the pressurized ink flows from the ink cavity 20 through a plurality of passages 38 in the plug 23. As shown in FIG. 6, there are four of the passages 38 equally angularly spaced about the circumference of the plug 23.

Figure 4:
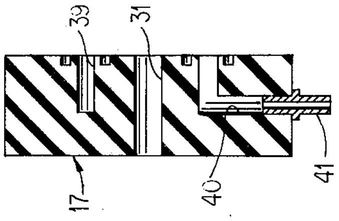
FIG. 4 is a sectional view of one of the end plates of the ink jet head of FIG. 1.

The passages 38 communicate with an annular passage or cavity 39 in the end plate 17. The annular passage or cavity 39 communicates through a passage 40 (see FIG. 4) in the end plate 17 and a connecting plug 41 to an ink reservoir or the like connected to the suction side of the pump. This flow path from the ink cavity 20 (see FIG. 2) is normally blocked.

An O-ring 42 is mounted in an annular groove in the entry end plate 15 and in surrounding relation to the annular passage or cavity 36. This prevents leakage.

The exit end plate 17 has a first O-ring 43 disposed in an annular groove therein and in surrounding relation to the annular passage or cavity 39 in the same manner as the O-ring 42 in the entry end plate 15 surrounds the annular passage or cavity 36. The exit end plate 17 has a second O-ring 44 mounted in an annular groove therein and in surrounding relation to the passage 31 in which the electrode 30 is disposed. Each of the O-rings 43 and 44 prevents leakage.

Figure 3:
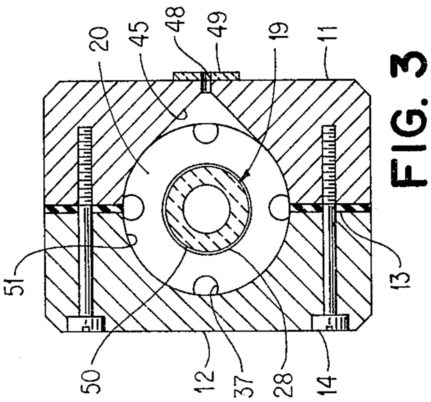
FIG. 3 is a sectional view of the ink jet head of FIG. 1 and taken along line 3—3 of FIG. 1.

The nozzle mounting plate 11 has a focusing cavity 45 (see FIG. 3) therein communicating with the ink cavity 20. The focusing cavity 45 increases the efficiency.

The nozzle mounting plate 11 has a relatively thin wall 46 (see FIG. 2) at the end of the focusing cavity 45 with a plurality of passages 47 formed therein. Each of the passages 47 is aligned with a nozzle 48 in a very thin nozzle plate 49, which is secured to the nozzle mounting plate 11 by suitable means such as an epoxy, for example. Thus, an array of the nozzles 48 is formed with each of the nozzles 48 having its axis aligned with the axis of one of the passages 47.

It should be understood that the wall 46 is substantially thicker than the nozzle plate 49 but is not so shown in the drawings for clarity purposes. As an example, the wall 46 could have a thickness of twenty mils and the nozzle plate 49 could have a thickness of one mil.

The axis of each of the nozzles 48 is disposed substantially perpendicular to the longitudinal axis of the tube 19 and the longitudinal axis of the ink cavity 20. The longitudinal axis of the ink cavity 20 is preferably coaxial with the longitudinal axis of the tube 19 although they could be parallel.

Accordingly, when the AC source 33 of power is energized at the operating frequency of the tube 19, the tube 19 vibrates radially. This causes each of the ink streams passing through the nozzles 48 to be broken up into droplets at a uniform break-off point, the droplets to be of substantially uniform size, and the droplets to have substantially uniform spacing therebetween.

The ink cavity 20 is preferably formed so that the liquid cavity resonance is at the desired frequency at which the tube 19 is to be operated. This is the operating frequency of the AC source 33 of power applied to the tube 19. Therefore, it is necessary for the spacing between outer surface 50 of the tube 19 and inner surface 51 of the ink cavity 20 to be selected so that the ink cavity 20 is at the resonant frequency at which the tube 19 is vibrated.

The focusing cavity 45 can be tuned to the same resonant frequency as the ink cavity 20. This is accomplished by varying the angle for the focusing cavity 45 and especially its depth.

It is well known that the length of perturbations in a liquid in an annular cavity is described by Bessel functions. If the presence of the focusing cavity 45 is ignored, a good approximation for the resonant modes of the annular ink cavity 20 is that the difference between the inner and outer radii of the cavity 20 is a multiple of a half wave length of the perturbation at a resonant frequency so that $dr=n(w/2)$ where dr is the difference between the inner and outer radii of the annular ink cavity 20, n is the resonant frequency mode, and w is the wave length of the perturbation or pressure wave in the cavity. The wave length w is related to the resonant frequency, f, and the velocity of sound in the material, c, by $c=fw$. When $n=1$, the lowest resonant frequency mode occurs within the annular ink cavity 20.

As an example, $f=100$ kHz and $c=6\times10^4$ in/sec ($1.524\times10^5$ cm/sec) when the liquid in the cavity is water (Ink has substantially the same properties as water.). Thus, if n=1 for the lowest mode, the cavity will resonate when $dr=w/2=c/2f=6\times(10^4/2\times10^5=0.3''$ (0.762 cm). Therefore, a difference of 0.3" (0.762 cm) between the inner and outer radii of the annular ink cavity 20 will enable resonance to occur at a frequency of 100 kHz.

Thus, with knowledge of the desired frequency of vibrations to be applied to the ink stream, the difference between the radius of the outer surface 50 of the tube 19 and the radius of the inner surface 51 of the cavity 20 can be selected. Therefore, the ink cavity 20 will resonate at the desired frequency, and this is the frequency at which the AC source 33 of power is operating.

In the formation of the vibrations in the radial mode, vibrations also are created along the length of the tube 19. These are caused by Poisson's ratio, which is due to the fact that a volume tends to be conserved for a solid so that compensation of volume requires shrinkage in one dimension when another dimension expands. If the vibrations of the tube 19 in its longitudinal or axial direction are coupled into the ink cavity 20, the desired uniform perturbations will not be produced at each of the nozzles 48.

One way of preventing propogation of longitudinal waves in the ink cavity 20 due to the vibrations of the tube 19 in the longitudinal or axial direction is to form each of the plugs 22 and 23 with a spherical end surface. This spherical end surface can destroy the uniform phase of any reflected wave in this longitudinal or axial direction to prevent propogation thereof. Instead of forming the plugs 22 and 23 with spherical end surfaces, the plugs 22 and 23 could be formed with an absorbing surface.

Another means of preventing the vibrations in the longitudinal direction within the ink cavity 20 is to prevent the production of such vibrations by the tube 19. This can be accomplished by forming the tube 19 with a length much smaller than the mean diameter of the tube 19. This will cause the fundamental and all harmonics of the resonant frequency along the length of the tube 19 to be substantially greater than the operating frequency of the tube 19 in its radial mode.

Figure 8:
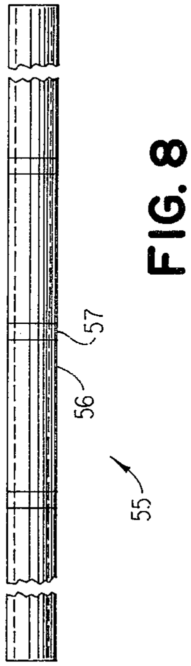
FIG. 8 is a fragmentary side elevational view of another form of the transducer for use with the ink jet head of the present invention.

To obtain this reduction in length relative to the mean diameter of the tube 19 while still having the vibrations produced over the desired length of the ink cavity 20, the tube 19 could be replaced by a right circular cylindrical tube 55 (see FIG. 8), which is formed of a plurality of right circular cylindrical segments 56 of a piezoelectric material with a very thin rubber washers 57 between each pair of the segments 56. For example, each of the segments 56 could have a length of fifty mils, and each of the rubber washers 57 could have a length of five to ten mils. This relative thinness of each of the rubber washers 57 with respect to the segments 56 results in the washers 57 not affecting uniform break up because the nozzles 48 are too far away from the tube 55.

Referring to FIGS. 9–14, there is shown an ink jet head 60 having a main body 61. The body 61 has a hollow cylindrical recess or cavity 62, which is a longitudinal passage, extending therethrough with four converging passages 63, 64, 65, and 66 (see FIG. 11) extending from the recess or cavity 62 to the exterior of the body 61.

An entry end plate 67 (see FIGS. 9 and 10) is secured to one end of the body 61, and an exit plate 68, which is formed of an electrically insulating material, is secured to the other end of the body 61. The end plates 67 and 68 are secured to the body 61 by suitable means such as screws (not shown), for example.

The tube 19 is disposed within the recess or cavity 62 in the body 61. The tube 19 has one end supported within a conical shaped plug 75 and its other end supported within a conical shaped plug 76, which is formed of an electrically insulating material. Each of the plugs 75 and 76 is supported within the recess or cavity 62 in the body 61.

The tube 19 fits within a circular recess 77 in the plug 75 and a circular recess 78 in the plug 76. A rubber boot or gasket 79 holds one end of the tube 19 within the recess 77 in the plug 75, and a rubber boot or gasket 80 holds the other end of the tube 19 within the recess 78 in the plug 76.

The electrode 30 extends through a passage 82 in the end plate 68 and a passage 83 in the plug 76. The electrode 30 is electrically connected to the inner cylindrical surface of the tube 19 so that the tube 19 is electrically connected to the AC source 33 of power.

Each of the passages 63 (see FIG. 11), 64, 65, and 66 in the body 61 has its smaller end blocked by a membrane 85, 86, 87, and 88, respectively. The membrane 85 is held against the side of the body 61 by a block 89, which is secured to the body 61 by suitable means such as screws 90, for example. The screws 90 also extend through the membrane 85. The block 89 has a focusing cavity 91 therein and prevented from having liquid communication with the passage 63 and the recess or cavity 62 by the membrane 85.

The block 89 has a relatively thin wall 92 (see FIG. 10) at the end of the focusing cavity 91 with a plurality of passages 93 formed therein. Each of the passages 93 is aligned with a nozzle 94 in a very thin nozzle plate 95, which is secured to the block 89 by suitable means such as an epoxy, for example. Thus, an array of the nozzles 94 is formed with each of the nozzles 94 having its axis aligned with the axis of one of the passages 93 in the thin wall 92 of the block 89.

It should be understood that the wall 92 is substantially thicker than the nozzle plate 95 but is not so shown in the drawings for clarity purposes. As an example, the wall 92 could have a thickness of twenty mils and the nozzle plate 95 could have a thickness of one mil.

The membranes 86–88 (see FIG. 11) are retained in a similar manner as the membrane 85. Additionally, a plurality of separate focusing cavities 96, 97, and 98 is formed in blocks 99, 100, and 101, respectively, in the same manner as the focusing cavity 91 is formed in the block 89.

The axis of each of the nozzles 94 is disposed substantially perpendicular to the longitudinal axis of the tube 19 and the longitudinal axis of the recess or cavity 62. The longitudinal axis of the recess or cavity 62 is preferably coaxial with the longitudinal axis of the tube 19 although they could be parallel. It should be understood that the nozzles in the nozzle plates 102, 103, and 104 communicating with each of the focusing cavities 96, 97, and 98, respectively, have their axes similarly arranged as the axis of each of the nozzles 94. Ink is supplied under pressure to the focusing cavity 91 through a passage 105 (see FIG. 10) in the block 89. Whenever it is desired to flush the ink from the focusing cavity 91, the pressurized ink flows from the focusing cavity 91 through a passage 106 in the block 89. The passage 106 is blocked except where there is flushing of the focusing cavity 91.

Each of the other focusing cavities 96 (see FIG. 11), 97, and 98 is separately connected to the same or a different pressurized source of ink. Thus, each of the focusing cavities 91, 96, 97, and 98 could have a different color ink therein.

While the membranes 85–88 prevent the recess or cavity 62 from having liquid communication with the focusing cavities 91, 96, 97, and 98, the material of the membranes 85–88 is selected so that pressure waves created within the recess or cavity 62 by the tube 19 are transmitted to the focusing cavities 91, 96, 97, and 98. Accordingly, the membranes 85–88 could be positioned anywhere in the passages 63–66, respectively, or in the focusing cavities 91, 96, 97, 98, respectively, or in the cavity 62. One suitable example of the material of the membranes 85–88 is Mylar.

The recess or cavity 62 in the body 61 has a liquid trapped therein to be responsive to the vibrations produced by excitation of the tube 19. The liquid can be supplied through a connecting plug 107 (see FIG. 9) in the end plate 67 and a passage (not shown) in the end plate 67 and similar to the passage 35 (see FIG. 5) in the end plate 15 to an annular passage or cavity 108 (see FIG. 10) in the end plate 67.

Figure 12:
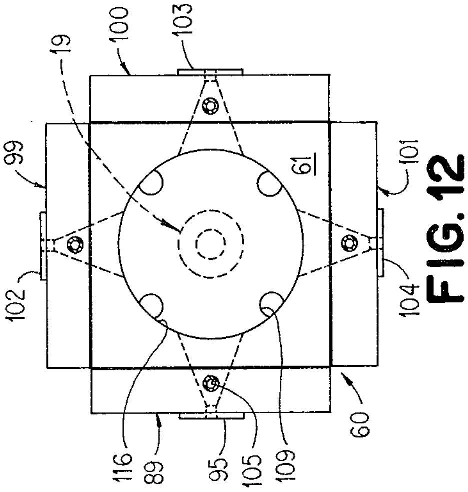
FIG. 12 is an end elevational view of the ink jet head of FIG. 9 and taken along line 12—12 of FIG. 10.
Figure 10:
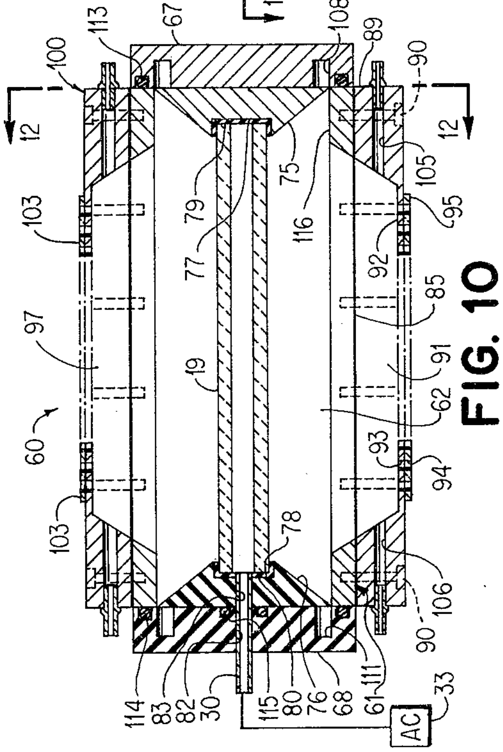
FIG. 10 is a longitudinal sectional view of the ink jet head of FIG. 9 and taken along line 10—10 of FIG. 9.

The annular cavity 108 communicates with the recess or cavity 62 through a plurality of passages 109 in the plug 75. As shown in FIG. 12, there are four of the passages 109 angularly spaced about the plug 75. Thus, the liquid is easily supplied to the recess or cavity 62.

Whenever desired, the liquid in the recess or cavity 62 can flow therefrom through a plurality of passages (not shown) in the plug 76. There are four of the passages angularly spaced about the plug 76 in the same manner as the four passages 109 are spaced about the plug 75.

The passages (not shown) in the plug 76 communicate with an annular passage or cavity 111 in the end plate 68. The annular passage or cavity 111 communicates through a passage (not shown) in the end plate 68 and similar to the passage 40 (see FIG. 4) in the exit end plate 17 and a connecting plug 112 (see FIG. 9). The connecting plugs 107 and 112 are blocked except when flushing of the recess or cavity 62 is desired.

The entry end plate 67 has an O-ring 113 (see FIG. 10) disposed in an annular groove therein and in surrounding relation to the annular passage or cavity 108. This prevents leakage.

The exit end plate 68 has a first O-ring 114 disposed in an annular groove therein and in surrounding relation to the annular passage or cavity 111 in the end plate 68 in the same manner as the O-ring 113 in the end plate 67 surrounds the annular passage or cavity 108. The end plate 68 has a second O-ring 115 mounted in an annular groove therein and in surrounding relation to the passage 82 through which the electrode 30 extends. Each of the O-rings 114 and 115 prevents leakage.

Figure 11:
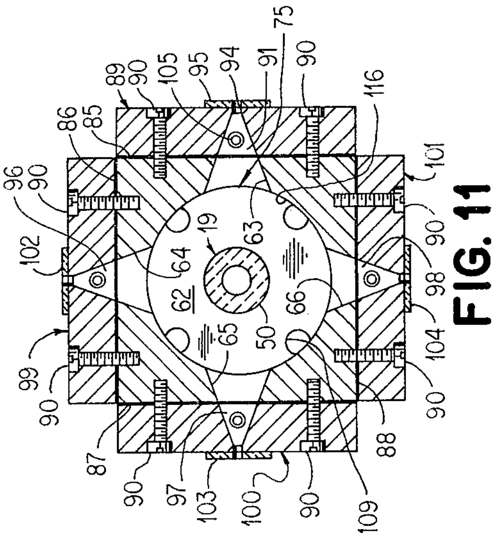
FIG. 11 is a sectional view of the ink jet head of FIG. 9 and taken along line 11—11 of FIG. 9.

As shown in FIG. 11, each of the passages 63–66 is formed to cooperate with the focusing cavities 91, 96, 97, and 98, respectively, as a continuation thereof so that the distance from inner cylindrical surface 116, which defines the recess or cavity 62, of the body 61 to the nozzle plate 95 is w/2 where w is the wave length of the perturbation or pressure wave in the cavity 62. Furthermore, the distance from the outer surface 50 of the tube 19 in the inner cylindrical surface 116 of the body 61 is w/2.

Accordingly, when the AC source 33 of power is energized at the operating frequency of the tube 19, the tube 19 vibrates radially in the same manner as described for the embodiment of FIG. 1. This causes each of the ink streams passing through the nozzles 94 (see FIG. 10) and each of the other arrays of nozzles to be broken up into droplets at a uniform break-off point, the droplets to be of substantially uniform size, and the droplets to have substantially uniform spacing therebetween.

The recess or cavity 62 is preferably formed so that the liquid cavity resonance is at the desired frequency at which the tube 19 is to be operated. This is the operating frequency of the AC source 33 of power applied to the tube 19. Therefore, it is necessary for the spacing between the outer surface 50 (see FIG. 11) of the tube 19 and the inner surface 116 of the body 61 to be selected so that the recess or cavity 62 is resonant at the frequency at which the tube 19 is vibrated.

Each of the focusing cavities 91, 96, 97, and 98, including the connecting passages 63, 64, 65, and 66, respectively, can be tuned to the same resonant frequency as the recess or cavity 62. This is accomplished by varying the angle for each of the focusing cavities and especially the depth of each of the focusing cavities.

It should be understood that the membranes 85–88 could be omitted if desired. This would occur where the ink from each of the arrays of the nozzles of the ink head 60 would be the same color. In such an arrangement, the passages 105 (see FIG. 10) and 106 in the block 89 and similar passages in the other blocks 99–101 (see FIG. 11) would be eliminated.

Thus, the ink would be supplied through the connecting plug 107 (see FIG. 9), the connecting passage (not shown) in the end plate 67, the annular passage or cavity 108 (see FIG. 10) in the end plate 67, and the passages 109 (see FIG. 11) in the plug 75 to the recess or cavity 62. The feeding from the connecting plug 107 (see FIG. 9) to the passages 109 (see FIG. 11) in the plug 75 would be in the same manner as described for supplying ink through the entry end plate 15 (see FIG. 2) in the ink jet head 10.

Figure 9:
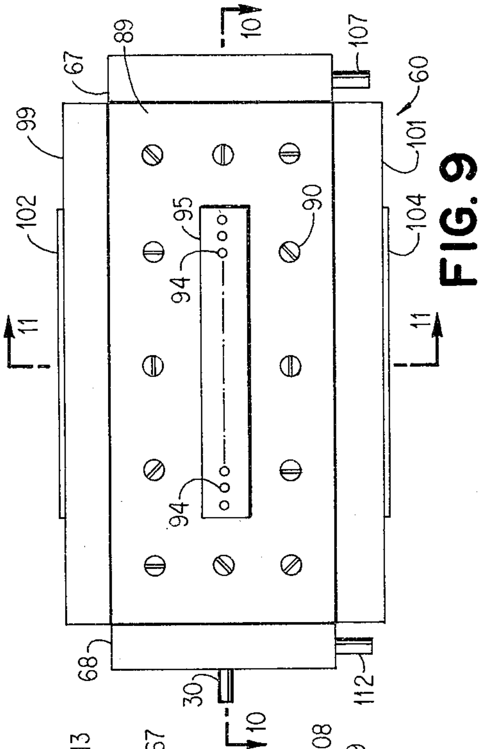
FIG. 9 is a side elevational view of another embodiment of the ink jet head of the present invention in which the ink jet head has a plurality of arrays of ink jet nozzles.

Whenever flushing of the recess or cavity 62 (see FIG. 10) is desired, the ink would be removed from the recess or cavity 62 through the passages (not shown) in the plug 76, the annular passage or cavity 111 in the end plate 68, the connecting passage (not shown) in the end plate 68, and the connecting plug 112 (see FIG. 9).

It should be understood that the tube 19 may be replaced by the tube 55 (see FIG. 8) if desired.

While the present invention has shown and described the tube 19 as being cylindrical, the inner surface 51 of the cavity 20 as being cylindrical, and the inner surface 116 of the body 61 as being cylindrical, it should be understood that such is not necessary for satisfactory operation. It is only necessary that the outer surface of the inner tube 19 and the cooperating inner surface of the outer means, which is defined by the nozzle mounting plate 11 and the back plate 12 or by the body 61, be of substantially the same shape. It is only necessary that the tube 19, when electrically excited, vibrate in a direction substantially perpendicular to the longitudinal axes of the tube 19 and the inner surface (the surface 51 or 116) of the outer means.

While only the tube 19 has been described as being piezoelectric, it should be understood that the outer means, which includes the nozzle mounting plate 11 and the back plate 12 in the embodiment of FIG. 1 and the body 61 of the modification of FIG. 9, could be formed as a hollow right circular cylindrical tube 120 (see FIGS. 15 and 16) and of a piezoelectric material.

Figure 15:
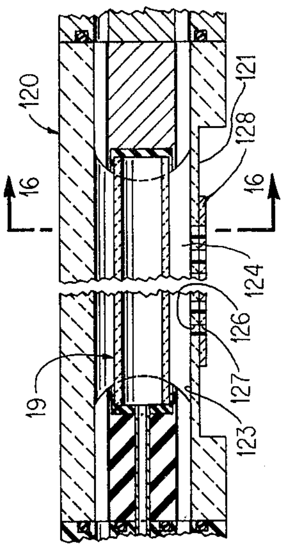
FIG. 15 is a fragmentary longitudinal sectional view of another modification of the ink jet head of the present invention and taken along line 15—15 of FIG. 16.
Figure 16:
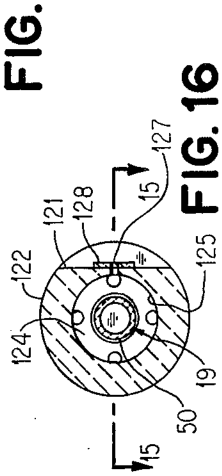
FIG. 16 is a sectional view of the ink jet head of FIG. 15 and taken along line 16—16 of FIG. 15.
Figure 14:
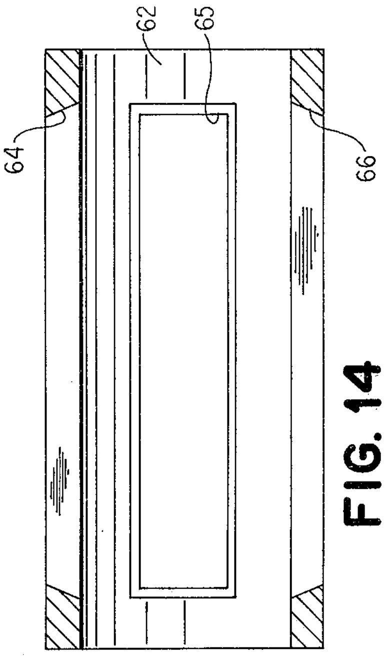
FIG. 14 is a longitudinal sectional view of the body of FIG. 13 and taken along line 14—14 of FIG. 13.
Figure 13:
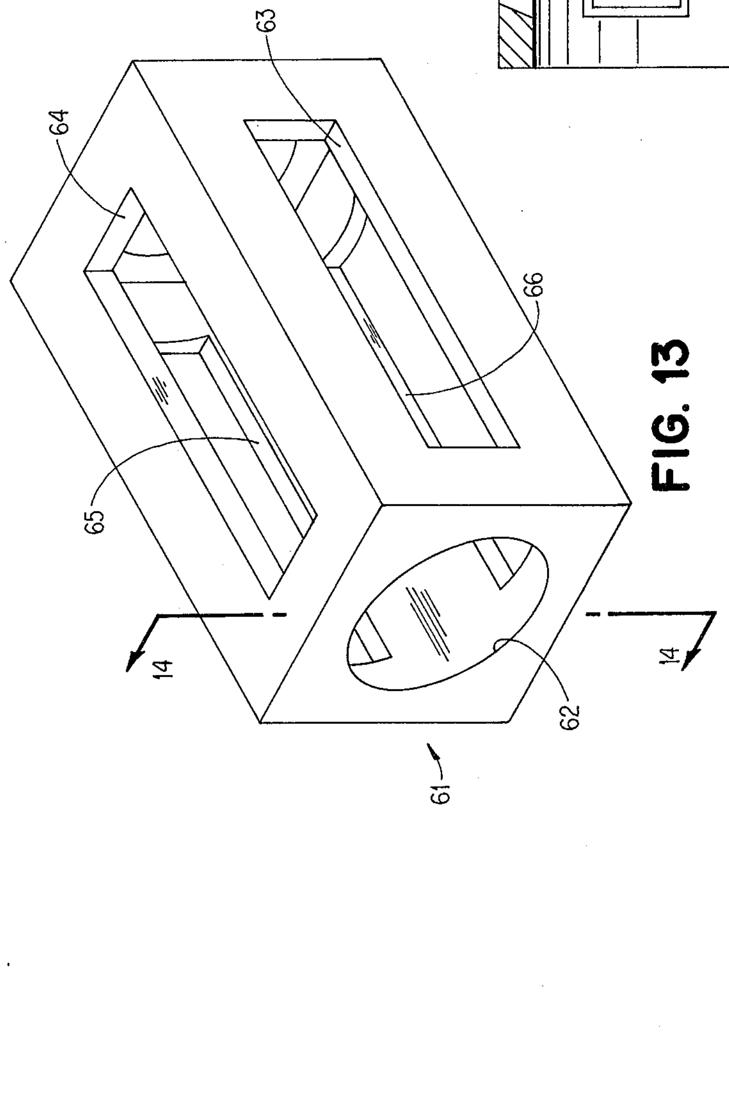
FIG. 13 is a perspective view of the main body of the ink jet head of FIG. 9.

In the modification of FIGS. 15 and 16, the outer tube 120 has a portion 121 of its outer cylindrical surface 122 flattened to form a relatively thin wall 123 in the outer tube 120. An annular ink cavity 124 is formed between the outer surface 50 of the tube 19 and inner cylindrical surface 125 of the outer tube 120.

The relatively thin wall 123 has a plurality of passages 126 formed therein in the same manner as the relatively thin wall 46 (see FIG. 2) has the plurality of passages 47 formed therein. Each of the passages 126 (see FIG. 15) is aligned with a nozzle 127 in a very thin nozzle plate 128, which is secured to the flattened portion 121 of the outer surface 122 of the outer tube 120 by suitable means such as an epoxy, for example. Thus, an array of the nozzles 127 is formed with each of the nozzles 127 having its axis aligned with the axis of one of the passages 126.

It should be understood that the wall 123 is substantially thicker than the nozzle plate 128 but is not so shown in the drawings for clarity purposes. As an example, the wall 123 could have a thickness of twenty mils and the nozzle plate 128 could have a thickness of one mil.

The axis of each of the nozzles 127 is disposed substantially perpendicular to the longitudinal axis of the tube 19 and the longitudinal axis of the ink cavity 124. The longitudinal axis of the ink cavity 124 is preferably coaxial with the longitudinal axis of the tube 19 although they could be parallel.

In the same manner as the ink cavity 20 of the modification of FIGS. 1-8, the ink cavity 124 is preferably formed so that the liquid cavity resonance is at the desired frequency at which the tube 19 is operated. This also is the operating frequency of the outer tube 120.

The remainder of the structure of the modification of FIGS. 15 and 16 is the same as that shown for the embodiment of FIGS. 1-8 except that the end plates 15 and 17 are circular in cross section.

It should be understood that the outer surface 122 of the outer tube 120 could have a plurality of the flattened portions 121 formed therein in a plurality of positions around the circumference. Each of these flattened portions would have one of the nozzle plates 128 thereon.

While the present invention has shown and described the ink cavity 20, for example, to be resonant throughout the entire cross sectional area of the ink cavity 20, it should be understood that such is not a requisite for satisfactory operation.

If the ink cavity 20 or 62 is not resonant at the operating frequency, it should be understood that the tube 19 could operate at its resonant frequency. It should be understood that the resonant frequency of the tube 19 can be easily determined in accordance with its frequency constant and its mean diameter. With the frequency constant varying in accordance with the piezoelectric material of the tube 19, selection of a specific piezoelectric material and a specific mean diameter of the tube 19 determines the frequency at which the AC source 33 of power is excited. This is the resonant operating frequency of the tube 19.

Additionally, if the ink cavity 124 is not resonant at the operating frequency, it should be understood that the tubes 19 and 120 could operate at the same resonant frequency. However, in order for the outer tube 120 to be resonant with the tube 19, it would have to be formed of a different piezoelectric material than the tube 19.

An advantage of this invention is that an efficient ink jet head is produced. Another advantage of this invention is that it can be fabricated without the use of adhesive within any cavity subjected to the ink. A further advantage of this invention is that it produces uniform generation of droplets from each of a plurality of arrays of nozzles at the same time. Still another advantage of this invention is that more than one color of ink can be supplied from a single ink jet head with all of the colors of ink having the same frequency.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An ink jet head for supplying at least one stream of ink droplets including:
   - outer means having an inner cylindrical surface defining a longitudinal passage therethrough;
   - an inner cylindrical tube disposed within said longitudinal passage in said outer means and having its outer cylindrical surface spaced from the inner cylindrical surface of said outer means, said inner cylindrical tube having its longitudinal axis substantially parallel to the longitudinal axis of the inner cylindrical surface of said outer means or coaxial therewith;
   - an ink cavity formed between the outer cylindrical surface of said inner cylindrical tube and the inner cylindrical surface of said outer means and having pressurized ink therein;
   - at least one ink jet nozzle in communication with said ink cavity and from which a stream of ink droplets is supplied;
   - each of said ink jet nozzles having its axis substantially perpendicular to the longitudinal axis of said inner cylindrical tube; and at least said inner cylindrical tube being formed of a piezoelectric material and vibrating radially when electrically excited to produce vibrations within the ink in said ink cavity so that a stream of substantially uniformly spaced ink droplets is supplied from any of said ink jet nozzles.

2. The head according to claim 1 in which at least said inner cylindrical tube is electrically excited at a desired resonant operating frequency.

3. The head according to claim 1 including at least one array of ink jet nozzles communicating with said ink cavity with a stream of substantially uniformly spaced ink droplets supplied from each of said ink jet nozzles and each of the streams having substantially the same break-off point.

4. The head according to claim 3 in which each of said inner cylindrical tube and said outer means is formed of a piezoelectric material.

5. The head according to claim 3 in which only said inner cylindrical tube is formed of a piezoelectric material.

6. The head according to claim 3 in which at least said inner cylindrical tube is electrically excited at a desired resonant operating frequency.

7. The head according to claim 6 in which only said inner cylindrical tube is formed of a piezoelectric material.

8. The head according to claim 3 in which said inner cylindrical tube has the diameter of its outer cylindrical surface selected in conjunction with the diameter of the inner cylindrical surface of said outer means so that said ink cavity is resonant at the desired operating frequency.

9. The head according to claim 8 in which each of said inner cylindrical tube and said outer means is formed of a piezoelectric material and their operating frequencies are the desired operating frequency.

10. The head according to claim 8 in which only said inner cylindrical tube is formed of a piezoelectric material.

11. The head according to claim 10 including means to maintain the lowest frequency of perturbations in the axial direction of said inner cylindrical tube substantially greater than the desired operating frequency.

12. The head according to claim 11 in which said maintaining means includes:

said inner cylindrical tube comprising a plurality of longitudinal segments so that the axial frequency of each of said segments is substantially greater than the desired operating frequency;

and means to acoustically isolate said segments from each other in the axial direction.

13. An ink jet head for supplying at least one stream of ink droplets including:

outer means having an inner surface defining a longitudinal passage therethrough;

an inner element disposed within said longitudinal passage in said outer means and having its outer surface spaced from the inner surface of said outer means, said outer means having its inner surface of substantially the same shape as the outer surface of said inner element, said inner element having its longitudinal axis substantially parallel to the longitudinal axis of the inner surface of said outer means or coaxial therewith;

an ink cavity formed between the inner surface of said outer means and the outer surface of said inner element and having pressurized ink therein;

at least one ink jet nozzle in communication with said ink cavity and from which a stream of ink droplets is supplied;

each of said ink jet nozzles having its axis substantially perpendicular to the longitudinal axis of said inner element;

and at least said inner element being formed of a piezoelectric material vibrating in a direction substantially perpendicular to the longitudinal axes of said inner element and the inner surface of said outer means when electrically excited to produce vibrations within the ink in said ink cavity so that a stream of substantially uniformly spaced ink droplets is supplied from any of said ink jet nozzles.

14. The head according to claim 13 in which at least said inner element is electrically excited at a desired resonant operating frequency.

15. The head according to claim 13 including at least one array of ink jet nozzles communicating with said ink cavity with a stream of substantially uniformly spaced ink droplets supplied from each of said ink jet nozzles and each of the streams having substantially the same break-off point.

16. The head according to claim 15 in which each of said inner element and said outer means is formed of a piezoelectric material.

17. The head according to claim 15 in which at least said inner element is electrically excited at a desired resonant operating frequency.

18. The head according to claim 17 in which only said inner element is formed of a piezoelectric material.

19. The head according to claim 15 in which the space between the outer surface of said inner element and the inner surface of said outer means is selected so that said ink cavity is resonant at the desired operating frequency.

20. The head according to claim 19 in which each of said inner element and said outer means is formed of a piezoelectric material and their operating frequencies are the desired operating frequency.

21. The head according to claim 19 in which only said inner element is formed of a piezoelectric material.

22. The head according to claim 21 including means to maintain the lowest frequency of perturbations in the axial direction substantially greater than the desired operating frequency.

23. The head according to claim 22 in which said maintaining means includes:

said inner element comprising a plurality of longitudinal segments so that the axial frequency of each of said segments is substantially greater than the desired operating frequency;

and means to acoustically isolate said segments from each other in the axial direction.

24. An ink jet head for supplying at least one stream of ink droplets including:

outer means having an inner surface defining a longitudinal passage therethrough;

an inner element disposed within said longitudinal passage in said outer means and having its outer surface spaced from the inner surface of said outer means, said outer means having its inner surface of substantially the same shape as the outer surface of said inner element, said inner element having its longitudinal axis substantially parallel to the longitudinal axis of the inner surface of said outer means or coaxial therewith;

a liquid cavity having the outer surface of said inner element as its inner wall;

at least one ink cavity disposed exterior of said liquid cavity and having pressurized ink therein;

means to acoustically couple said liquid cavity to said ink cavity while preventing liquid transmission therebetween;

said ink cavity having at least one ink jet nozzle in communication therewith and from which a stream of ink droplets is supplied, each of said ink jet nozzles havings its axis substantially perpendicular to the longitudinal axis of said inner element;

and said inner element being formed of a piezoelectric material and vibrating in a direction substantially perpendicular to the longitudinal axes of said inner element and the inner surface of said outer means when electrically excited to cause vibrations within the ink in said ink cavity so that a stream of substantially uniformly spaced ink droplets is supplied from any of said ink jet nozzles.

25. The head according to claim 24 in which said inner element is electrically excited at a desired resonant operating frequency.

26. The head according to claim 24 including:

a plurality of separate ink cavities disposed exterior of said liquid cavity;

and separate means to acoustically couple each of said ink cavities to said liquid cavity while preventing liquid transmission therebetween.

27. The head according to claim 24 including at least one array of ink jet nozzles communicating with each of said ink cavities with a stream of substantially uniformly spaced ink droplets supplied from each of said ink jet nozzles and each of the streams having substantially the same break-off point.

28. The head according to claim 27 including:
a plurality of separate ink cavities disposed exterior of said liquid cavity;
an separate means to acoustically couple each of said ink cavities to said liquid cavity while preventing liquid transmission therebetween.

29. The head according to claim 27 in which said inner element is electrically excited at a desired resonant operating frequency.

30. The head according to claim 27 in which the space between the outer surface of said inner element and the inner surface of said outer means is selected so that said liquid cavity and said ink cavity are resonant at the desired operating frequency.

31. The head according to claim 30 including means to maintain the lowest frequency of perturbations in the axial direction substantially greater than the desired operating frequency.

32. The head according to claim 31 in which said maintaining means includes:
said inner element comprising a plurality of longitudinal segments so that the axial frequency of each of said segments is substantially greater than the desired operating frequency;
and means to acoustically isolate said segments from each other in the axial direction.

33. An ink jet head for supplying at least one stream of ink droplets including:
outer means having an inner cylindrical surface defining a longitudinal passage therethrough;
an inner cylindrical tube disposed within said longitudinal passage in said outer means and having its outer cylindrical surface spaced from the inner cylindrical surface of said outer means, said outer means having its inner cylindrical surface of substantially the same shape as the outer cylindrical surface of said inner cylindrical tube, said inner cylindrical tube having its longitudinal axis substantially parallel to the longitudinal axis of the inner cylindrical surface of said outer means or coaxial therewith;
a liquid cavity having the outer cylindrical surface of said inner cylindrical tube as its inner wall;
at least one ink cavity disposed exterior of said liquid cavity and having pressurized ink therein;
means to acoustically couple said liquid cavity to said ink cavity while preventing liquid transmission therebetween;
said ink cavity having at least one ink jet nozzle in communication therewith and from which a stream of ink droplets is supplied, each of said ink jet nozzles having its axis substantially perpendicular to the longitudinal axis of said inner cylindrical tube;
and said inner cylindrical tube being formed of a piezoelectric material and vibrating radially when electrically excited to cause vibrations within the ink in said ink cavity so that a stream of substantially uniformly spaced ink droplets is supplied from any of said ink jet nozzles.

34. The head according to claim 33 in which said inner cylindrical tube is electrically excited at a desired resonant operating frequency.

35. The head according to claim 33 including:
a plurality of separate ink cavities disposed exterior of said liquid cavity;
and separate means to acoustically couple each of said ink cavities to said liquid cavity while preventing liquid transmission therebetween.

36. The head according to claim 33 including at least one array of ink jet nozzles communicating with each of said ink cavities with a stream of substantially uniformly spaced ink droplets supplied from each of said ink jet nozzles and each of the streams having substantially the same break-off point.

37. The head according to claim 36 in which said inner cylindrical tube is electrically excited at a desired resonant operating frequency.

38. The head according to claim 37 including:
a plurality of separate ink cavities disposed exterior of said liquid cavity;
and separate means to acoustically couple each of said ink cavities to said liquid cavity while preventing liquid transmission therebetween.

39. The head according to claim 36 in which said inner cylindrical tube has the diameter of its outer cylindrical surface selected in conjunction with the diameter of the inner cylindrical surface of said outer means so that said liquid cavity and said ink cavity are resonant at the desired operating frequency.

40. The head according to claim 39 including means to maintain the lowest frequency of perturbations in the axial direction substantially greater than the desired operating frequency.

41. The head according to claim 40 in which said maintaining means includes:
said inner cylindrical tube comprising a plurality of longitudinal segments so that the axial frequency of each of said segments is substantially greater than the desired operating frequency;
and means to acoustically isolate said segments from each other in the axial direction.

42. A method of forming an ink jet head for supplying at least one stream of ink droplets including:
disposing an inner cylindrical tube within a longitudinal passage in outer means having an inner cylindrical surface defining the longitudinal passage with the inner cylindrical tube having its outer surface spaced from the inner cylindrical surface of the outer means and with the longitudinal axes of the inner cylindrical tube and the inner cylindrical surface of the outer means being substantially parallel or coaxial;
forming an ink cavity between the outer surface of the inner cylindrical tube and the inner cylindrical surface of the outer means with pressurized ink therein;
disposing at least one ink jet nozzle in communication with the ink cavity and from which the stream of the ink droplets is supplied;
disposing each of the ink jet nozzles with its axis substantially perpendicular to the longitudinal axis of the inner cylindrical tube;
and forming at least the inner cylindrical tube of a piezoelectric material so that at least the inner cylindrical tube vibrates radially when electrically excited to produce vibrations in the ink in the ink cavity so that a stream of substantially uniformly spaced ink droplets is supplied from any of the ink jet nozzles.

43. The method according to claim 42 including disposing at least one array of the ink jet nozzles in communication with the ink cavity so that a stream of substantially uniformly spaced ink droplets is supplied from each of the ink jet nozzles with each of the streams having substantially the same break-off point.

44. The method according to claim 43 including forming at least the inner cylindrical tube to vibrate at a desired resonant operating frequency when electrically excited.

45. The method according to claim 43 including forming each of the inner cylindrical tube and the outer means of a piezoelectric material to vibrate at the same desired resonant operating frequency when electrically excited.

46. The method according to claim 43 including forming only the inner cylindrical tube of a piezoelectric material.

47. The method according to claim 43 including selecting the diameters of the outer cylindrical surface of the inner cylindrical tube and the inner cylindrical surface of the outer means so that the ink cavity is resonant at the desired operating frequency.

48. The method according to claim 47 including forming only the inner cylindrical tube of a piezoelectric material.

49. The method according to claim 48 including:

forming the inner cylindrical tube of a plurality of longitudinal segments so that the axial frequency of each of the segments is substantially greater than the desired operating frequency;

and acoustically isolating the segments from each other in the axial direction.

50. A method of forming an ink jet head for supplying at least one stream of ink droplets including:

disposing an inner element within a longitudinal passage in outer means having an inner surface defining the longitudinal passage with the inner element having its outer surface spaced from the inner surface of the outer means and of substantially the same shape as the inner surface of the outer means and with the longitudinal axes of the inner element and the inner surface of the outer means being substantially parallel or coaxial;

forming an ink cavity between the outer surface of the inner element and the inner surface of the outer means with pressurized ink therein;

disposing at least one ink jet nozzle in communication with the ink cavity and from which the stream of the ink droplets is supplied;

disposing each of the ink jet nozzles with its axis substantially perpendicular to the longitudinal axis of the inner element;

and forming at least the inner element of a piezoelectric material so that at least the inner element vibrates substantially perpendicular to the longitudinal axes of the inner element and the inner surface of the outer means when electrically excited to produce vibrations in the ink in the ink cavity so that a stream of substantially uniformly spaced ink droplets is supplied from any of the ink jet nozzles.

51. The method according to claim 50 including disposing at least one array of the ink jet nozzles in communication with the ink cavity so that a stream of substantially uniformly spaced ink droplets is supplied from each of the ink jet nozzles with each of the streams having substantially the same break-off point.

52. The method according to claim 51 including forming at least the inner element to vibrate at a desired resonant operating frequency when electrically excited.

53. The method according to claim 51 including forming each of the inner element and the outer means of a piezoelectric material to vibrate at the same desired resonant operating frequency.

54. The method according to claim 51 including selecting the distance between the outer surface of the inner element and the inner surface of the outer means so that the ink cavity is resonant at the desired operating frequency.

55. The method according to claim 54 including forming only the inner element of a piezoelectric material.

56. The method according to claim 55 including:

forming the inner element of a plurality of longitudinal segments so that the axial frequency of each of the segments is substantially greater than the desired operating frequency;

and acoustically isolating the segments from each other in the axial direction.

57. A method of forming an ink jet head for supplying at least one stream of ink droplets including:

disposing an inner element within a longitudinal passage in outer means having an inner surface defining the longitudinal passage with the inner element having its outer surface spaced from the inner surface of the outer means and of substantially the same shape as the inner surface of the outer means and with the longitudinal axes of the inner element and the inner surface of the outer means being substantially parallel or coaxial;

forming a liquid cavity with the outer surface of the inner element as its inner wall;

forming at least one ink cavity exterior of the liquid cavity with pressurized ink therein and acoustically coupled to the liquid cavity while having no liquid transmission therebetween;

disposing at least one ink jet nozzle in communication with the ink cavity and from which the stream of ink droplets is supplied;

disposing each of the ink jet nozzles with its axis substantially perpendicular to the longitudinal axis of the inner element;

and forming the inner element of a piezoelectric material so that the inner element vibrates radially when electrically excited to cause vibrations in the ink in the ink cavity so that a stream of substantially uniformly spaced ink droplets is supplied from any of the ink jet nozzles.

58. The method according to claim 57 including disposing at least one array of the ink jet nozzles in communication with the ink cavity so that a stream of substantially uniformly spaced ink droplets is supplied from each of the ink jet nozzles with each of the streams having substantially the same break-off point.

59. The method according to claim 58 including selecting the distance between the outer surface of the inner element and the inner surface of the outer means so that the liquid cavity and the ink cavity are resonant at the desired operating frequency.

60. The method according to claim 59 including:

forming the inner element of a plurality of longitudinal segments so that the axial frequency of each of the segments is substantially greater than the desired operating frequency;

and acoustically isolating the segments from each other in the axial direction.

61. The method according to claim 58 including forming the inner element to vibrate at a desired resonant operating frequency when electrically excited.

62. The method according to claim 61 including:

forming a plurality of separate ink cavities exterior of the liquid cavity;

and acoustically coupling each of the ink cavities separately to the liquid cavity.

63. A method of forming an ink jet head for supplying at least one stream of ink droplets including:

disposing an inner cylindrical tube within a longitudinal passage in outer means having an inner cylindrical surface defining the longitudinal passage with the inner cylindrical tube having its outer surface spaced from the inner cylindrical surface of the outer means and of substantially the same shape as the inner cylindrical surface of the outer means and with the longitudinal axes of the inner cylindrical tube and the inner cylindrical surface of the outer means being substantially parallel or coaxial;

forming a liquid cavity with the outer cylindrical surface of the inner cylindrical tube as its inner wall;

forming at least one ink cavity exterior of the liquid cavity with pressurized ink therein and acoustically coupled to the liquid cavity while having no liquid transmission therebetween;

disposing at least one ink jet nozzle in communication with the ink cavity and from which the stream of ink droplets is supplied;

disposing each of the ink jet nozzles with its axis substantially perpendicular to the longitudinal axis of the inner cylindrical tube;

and forming the inner cylindrical tube of a piezoelectric material so that the inner cylindrical tube vibrates radially when electrically excited to cause vibrations in the ink in the ink cavity so that a stream of substantially uniformly spaced ink droplets is supplied from any of the ink jet nozzles.

64. The method according to claim 63 including disposing at least one array of the ink jet nozzles in communication with the ink cavity so that a stream of substantially uniformly spaced ink droplets is supplied from each of the ink jet nozzles with each of the streams having substantially the same break-off point.

65. The method according to claim 64 including selecting the diameters of the outer cylindrical surface of the inner cylindrical tube and the inner cylindrical surface of the outer means so that the liquid cavity and the ink cavity are resonant at the desired operating frequency.

66. The method according to claim 65 including:

forming the inner cylindrical tube of a plurality of longitudinal segments so that the axial frequency of each of the segments is substantially greater than the desired operating frequency;

and acoustically isolating the segments from each other in the axial direction.

67. The method according to claim 64 including forming the inner cylindrical tube to vibrate at a desired resonant operating frequency when electrically excited.

68. The method according to claim 67 including:

forming a plurality of separate ink cavities exterior of the liquid cavity;

and acoustically coupling each of the ink cavities separately to the liquid cavity.

69. An ink jet head for supplying at least one stream of ink droplets including:

outer means having an inner cylindrical surface defining a longitudinal passage therethrough;

an inner cylindrical tube disposed within said longitudinal passage in said outer means and having its outer cylindrical surface spaced from the inner cylindrical surface of said outer means, said inner cylindrical tube having its longitudinal axis substantially parallel to the longitudinal axis of the inner cylindrical surface of said outer means or coaxial therewith;

a liquid cavity formed at least between the outer cylindrical surface of said inner cylindrical tube and the inner cylindrical surface of said outer means and having liquid therein;

at least a portion of said liquid cavity having pressurized ink therein as the liquid;

at least one ink jet nozzle in communication with the ink within said liquid cavity and from which a stream of ink droplets is supplied;

each of said jet nozzles having its axis substantially perpendicular to the longitudinal axis of said inner cylindrical tube;

and at least said inner cylindrical tube being formed of a piezoelectric material and vibrating radially when electrically excited to produce vibrations within the liquid in said liquid cavity so that a stream of substantially uniformly spaced ink droplets is supplied from any of said ink jet nozzles.

70. The head according to claim 69 in which at least said inner cylindrical tube is electrically excited at a desired resonant operating frequency.

71. The head according to claim 69 including at least one array of ink jet nozzles communicating with said ink cavity with a stream of substantially uniformly spaced ink droplets supplied from each of said ink jet nozzles and each of the streams having substantially the same break-off point.

72. The head according to claim 71 in which each of said inner cylindrical tube and said outer means is formed of a piezoelectric material.

73. The head according to claim 71 in which only said inner cylindrical tube is formed of a piezoelectric material.

74. The head according to claim 71 in which at least said inner cylindrical tube is electrically excited at a desired resonant operating frequency.

75. The head according to claim 74 in which only said inner cylindrical tube is formed of a piezoelectric material.

76. The head according to claim 71 in which said inner cylindrical tube has the diameter of its outer cylindrical surface selected in conjunction with the diameter of the inner cylindrical surface of said outer means so that said liquid cavity is resonant at the desired operating frequency.

77. The head according to claim 76 in which each of said inner cylindrical tube and said outer means is formed of a piezoelectric material and their operating frequencies are the desired operating frequency.

78. The head according to claim 76 in which only said inner cylindrical tube is formed of a piezoelectric material.

79. The head according to claim 78 including means to maintain the lowest frequency of perturbations in the axial direction of said inner cylindrical tube substantially greater than the desired operating frequency.

80. The head according to claim 79 in which said maintaining means includes:

said inner cylindrical tube comprising a plurality of longitudinal segments so that the axial frequency of each of said segments is substantially greater than the desired operating frequency;

and means to acoustically isolate segments from each other in the axial direction.

81. An ink jet head for supplying at least one stream of ink droplets including:

outer means having an inner surface defining a longitudinal passage therethrough;

an inner element disposed within said longitudinal passage in said outer means and having its outer surface spaced from the inner surface of said outer means, said outer means having its inner surface of substantially the same shape as the outer surface of said inner element, said inner element having its longitudinal axis substantially parallel to the longitudinal axis of the inner surface of said outer means or coaxial therewith;

a liquid cavity formed at least between the inner surface of said outer means and the outer surface of said inner element and having liquid therein;

at least a portion of said liquid cavity having pressurized ink therein as the liquid;

at least one ink jet nozzle in communication with the ink within said liquid cavity and from which a stream of ink droplets is supplied;

each of said ink jet nozzles having its axis substantially perpendicular to the longitudinal axis of said inner element;

and at least said inner element being formed of a piezoelectric material and vibrating in a direction substantially perpendicular to the longitudinal axes of said inner element and the inner surface of said outer means when electrically excited to produce vibrations within the liquid in said liquid cavity so that a stream of substantially uniformly spaced ink droplets is supplied from any of said ink jet nozzles.

82. The head according to claim 81 in which at least said inner element is electrically excited at a desired resonant operating frequency.

83. The head according to claim 81 including at least one array of ink jet nozzles communicating with the ink within said liquid cavity with a stream of substantially uniformly spaced ink droplets supplied from each of said ink jet nozzles and each of the streams having substantially the same break-off point.

84. The head according to claim 83, in which each of said inner element and said outer means is formed of a piezoelectric material.

85. The head according to claim 83 in which at least said inner element is electrically excited at a desired resonant operating frequency.

86. The head according to claim 85, in which only said inner element is formed of a piezoelectric material.

87. The head according to claim 83 in which the space between the outer surface of said inner element and the inner surface of said outer means is selected so that said liquid cavity is resonant at the desired operating frequency.

88. The head according to claim 87 in which each of said inner element and said outer means is formed of a piezoelectric material and their operating frequencies are the desired operating frequency.

89. The head according to claim 87 in which only said inner element is formed of a piezoelectric material.

90. The head according to claim 89 including means to maintain the lowest frequency of perturbations in the axial direction substantially greater than the desired operating frequency.

91. The head according to claim 90 in which said maintaining means includes:

said inner element comprising a plurality of longitudinal segments so that the axial frequency of each of said segments is substantially greater than the desired operating frequency;

and means to acoustically isolate said segments from each other in the axial direction.

92. A method of forming an ink jet head for supplying at least one stream of ink droplets including:

disposing an inner cylindrical tube within a longitudinal passage in outer means having an inner cylindrical surface defining the longitudinal passage with the inner cylindrical tube having its outer surface spaced from the inner cylindrical surface of the outer means and with the longitudinal axes of the inner cylindrical tube and the inner cylindrical surface of the outer means being substantially parallel or coaxial;

forming a liquid cavity at least between the outer surface of the inner cylindrical tube and the inner cylindrical surface of the outer means with at least a portion of the liquid cavity having pressurized ink therein as the liquid;

disposing at least one ink jet nozzle in communication with the ink within the liquid cavity and from which the stream of the ink droplets is supplied;

disposing each of the ink jet nozzles with its axis substantially perpendicular to the longitudinal axis of the inner cylindrical tube;

and forming at least the inner cylindrical tube of a piezoelectric material so that at least the inner cylindrical tube vibrates radially when electrically excited to produce vibrations in the liquid in the liquid cavity so that a stream of substantially uniformly spaced ink droplets is supplied from any of the ink jet nozzles.

93. The method according to claim 92 including forming at least the inner cylindrical tube to vibrate at a desired resonant operating frequency when electrically excited.

94. The method according to claim 92 including forming each of the inner cylindrical tube and the outer means of a piezoelectric material to vibrate at the same desired resonant operating frequency when electrically excited.

95. The method according to claim 92 including forming only the inner cylindrical tube of a piezoelectric material.

96. The method according to claim 92 including disposing at least one array of the ink jet nozzles in communication with the ink within the liquid cavity so that a stream of substantially uniformly spaced ink droplets is supplied from each of the ink jet nozzles with each of the streams having substantially the same break-off point.

97. The method according to claim 96 including selecting the diameters of the outer cylindrical surface of the inner cylindrical tube and the inner cylindrical surface of the outer means so that the liquid cavity is resonant at the desired operating frequency.

98. The method according to claim 97 including forming only the inner cylindrical tube of a piezoelectric material.

99. The method according to claim 98 including:

forming the inner cylindrical tube of a plurality of longitudinal segments so that the axial frequency of each of the segments is substantially greater than the desired operating frequency;

and accoustically isolating the segments from each other in the axial direction.

100. A method of forming an ink jet head for supplying at least one stream of ink droplets including:

disposing an inner element within a longitudinal passage in outer means having an inner surface defining the longitudinal passage with the inner element having its outer surface spaced from the inner surface of the outer means and of substantially the same shape as the inner surface of the outer means and with the longitudinal axes of the inner element and the inner surface of the outer means being substantially parallel or coaxial;

forming a liquid cavity at least between the outer surface of the inner element and the inner surface of the outer means with at least a portion of the liquid cavity having pressurized ink therein as the liquid;

disposing at least one ink jet nozzle in communication with the ink within the liquid cavity and from which the stream of the ink droplets is supplied;

disposing each of the ink jet nozzles with its axis substantially perpendicular to the longitudinal axis of the inner element;

and forming at least the inner element of a piezoelectric material so that at least the inner element vibrates substantially perpendicular to the longitudinal axes of the inner element and the inner surface of the outer means when electrically excited to produce vibrations in the liquid in the liquid cavity so that a stream of substantially uniformly spaced ink droplets is supplied from any of the ink jet nozzles.

101. The method according to claim 100 including disposing at least one array of the ink jet nozzles in communication with the ink within the liquid cavity so that a stream of substantially uniformly spaced ink droplets is supplied from each of the ink jet nozzles with each of the streams having substantially the same breakoff point.

102. The method according to claim 101 including forming at least the inner element to vibrate at a desired resonant operating frequency when electrically excited.

103. The method according to claim 101 including forming each of the inner element and the outer means of a piezoelectric material to vibrate at the same desired resonant operating frequency.

104. The method according to claim 101 including selecting the distance between the outer surface of the inner element and the inner surface of the outer means so that the liquid cavity is resonant at the desired operating frequency.

105. The method according to claim 104 including forming only the inner element of a piezoelectric material.

106. The method according to claim 105 including:

forming the inner element of a plurality of longitudinal segments so that the axial frequency of each of the segments is substantially greater than the desired operating frequency;

and accoustically isolating the segments from each other in the axial direction.

* * * * *